United States Patent
Kuwajima et al.

(10) Patent No.: US 11,110,693 B2
(45) Date of Patent: Sep. 7, 2021

(54) LAMINATE AND COPOLYMER

(71) Applicant: DAIKIN INDUSTRIES, LTD., Osaka (JP)

(72) Inventors: Yuuki Kuwajima, Osaka (JP); Toshiaki Masui, Osaka (JP); Takeshi Inaba, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 120 days.

(21) Appl. No.: 16/325,465

(22) PCT Filed: Jul. 21, 2017

(86) PCT No.: PCT/JP2017/026388
§ 371 (c)(1),
(2) Date: Feb. 14, 2019

(87) PCT Pub. No.: WO2018/047477
PCT Pub. Date: Mar. 15, 2018

(65) Prior Publication Data
US 2019/0210339 A1    Jul. 11, 2019

(30) Foreign Application Priority Data

Sep. 6, 2016  (JP) .............................. JP2016-173671

(51) Int. Cl.
| | | |
|---|---|---|
| B32B 27/30 | (2006.01) | |
| B32B 25/08 | (2006.01) | |
| C08F 216/14 | (2006.01) | |
| C08F 214/18 | (2006.01) | |
| B32B 7/06 | (2019.01) | |
| B32B 25/16 | (2006.01) | |
| C08F 214/26 | (2006.01) | |

(52) U.S. Cl.
CPC .............. *B32B 27/304* (2013.01); *B32B 7/06* (2013.01); *B32B 25/08* (2013.01); *B32B 25/16* (2013.01); *C08F 214/18* (2013.01); *C08F 214/262* (2013.01); *C08F 216/14* (2013.01); *B32B 2250/24* (2013.01); *B32B 2270/00* (2013.01); *B32B 2307/724* (2013.01); *B32B 2307/732* (2013.01); *B32B 2319/00* (2013.01); *B32B 2327/18* (2013.01); *C08F 2800/10* (2013.01)

(58) Field of Classification Search
None
See application file for complete search history.

(56) References Cited

U.S. PATENT DOCUMENTS

| | | | |
|---|---|---|---|
| 9,266,986 B2 * | 2/2016 | Shimono | ............. C08F 214/265 |
| 2007/0219333 A1 | 9/2007 | Shimono et al. | |
| 2009/0246435 A1 * | 10/2009 | Shimono | ................... B32B 1/02 428/36.91 |
| 2014/0248496 A1 | 9/2014 | Kuwajima et al. | |

FOREIGN PATENT DOCUMENTS

| | | |
|---|---|---|
| CN | 1942492 A | 4/2007 |
| CN | 101466541 A | 6/2009 |
| JP | 2013-099935 A | 5/2013 |
| JP | 2015-013432 A | 1/2015 |
| JP | 2015-123676 A | 7/2015 |
| JP | 2015-231717 A | 12/2015 |
| WO | 2011/099414 A1 | 8/2011 |
| WO | 2013/089200 A1 | 6/2013 |

OTHER PUBLICATIONS

Communication dated Jan. 14, 2020 from the European Patent Office in counterpart application No. 17848422.6.
International Search Report for PCT/JP2017/026388, dated Sep. 5, 2017.
International Preliminary Report on Patentability with a Translation of Written Opinion in International Application No. PCT/JP2017/026388, dated Mar. 12, 2019.

\* cited by examiner

*Primary Examiner* — Ramsey Zacharia
(74) *Attorney, Agent, or Firm* — Sughrue Mion, PLLC

(57) ABSTRACT

The invention provides a laminate in which a fluororesin layer and a rubber layer are firmly bonded to each other and the fluororesin layer has low fuel permeability and is less likely to suffer solvent cracking. The laminate includes a rubber layer (A) and a fluororesin layer (B). The fluororesin layer (B) contains a copolymer containing a chlorotrifluoroethylene unit, a tetrafluoroethylene unit, and a perfluoroalkyl vinyl ether unit. The copolymer contains 96.0 to 97.4 mol % of the chlorotrifluoroethylene unit and the tetrafluoroethylene unit relative to all the monomer units constituting the copolymer and 2.6 to 4.0 mol % of the perfluoroalkyl vinyl ether unit relative to all the monomer units constituting the copolymer.

3 Claims, No Drawings

LAMINATE AND COPOLYMER

CROSS REFERENCE TO RELATED APPLICATIONS

This Application is a National Stage of International Application No. PCT/JP2017/026388 filed Jul. 21, 2017, claiming priority based on Japanese Patent Application No. 2016-173671 filed Sep. 6, 2016.

TECHNICAL FIELD

The invention relates to laminates and copolymers.

BACKGROUND ART

Fuel transfer pipes for gasoline or other fuels are made of fluororesins because of their processability, anti-corrosiveness, light weight, and economic efficiency. These fluororesins further need to have fuel cracking resistance and fuel permeation resistance.

Patent Literature 1 discloses a fluorine-containing copolymer having fuel cracking resistance and fuel permeation resistance. This fluorine-containing copolymer contains a polymerized unit based on chlorotrifluoroethylene, a polymerized unit based on tetrafluoroethylene, a polymerized unit based on a monomer (A), and a polymerized unit based on a monomer (B). The sum of the amounts of the polymerized unit based on chlorotrifluoroethylene and the polymerized unit based on tetrafluoroethylene is 80.0 to 99.8 mol %; the amount of the polymerized unit based on the monomer (A) is 19.0 to 0.1 mol %; and the amount of the polymerized unit based on the monomer (B) is 10.0 to 0.1 mol %. The monomer (A) is at least one monomer selected from the group consisting of a fluoroolefin represented by the following formula (i):

$$CX^3X^4=CX^1(CF_2)_nX^2 \quad (i)$$

(wherein $X^1$, $X^3$, and $X^4$ are the same as or different from each other, and are each a hydrogen atom or a fluorine atom; $X^2$ is a hydrogen atom, a fluorine atom, or a chlorine atom; and n is 1 or 2) and a perfluoro(alkyl vinyl ether) represented by the following formula (ii):

$$CF_2=CF-ORf^1 \quad (ii)$$

(wherein $Rf^1$ is a C1-C2 perfluoroalkyl group). The monomer (B) is at least one monomer selected from the group consisting of a fluoroolefin represented by the following formula (iii):

$$CX^3X^4=CX^1(CF_2)_mX^2 \quad (iii)$$

(wherein $X^1$, $X^3$, and $X^4$ are the same as or different from each other, and are each a hydrogen atom or a fluorine atom; $X^2$ is a hydrogen atom, a fluorine atom, or a chlorine atom; and m is an integer of 3 to 10) and a perfluoro(alkyl vinyl ether) represented by the following formula (iv):

$$CF_2=CF-ORf^2 \quad (iv)$$

(wherein $Rf^2$ is a C3-C8 perfluoroalkyl group).

CITATION LIST

Patent Literature

Patent Literature 1: WO 2011/099414

SUMMARY OF INVENTION

Technical Problem

Further improvement is still demanded in terms of the fuel cracking resistance and fuel permeation resistance of fluororesins. Laminated rubber hoses including a fluororesin barrier layer for achieving good flexibility and low fuel permeability are used as fuel-transporting rubber hoses. Thus, a technique of firmly bonding fluororesin to rubber is also demanded.

In view of the above current state of the art, the invention aims to provide a laminate in which a fluororesin layer and a rubber layer are firmly bonded to each other and the fluororesin layer has low fuel permeability and is less likely to suffer solvent cracking.

Solution to Problem

The invention relates to a laminate including a rubber layer (A) and a fluororesin layer (B), the fluororesin layer (B) containing a copolymer containing a chlorotrifluoroethylene unit, a tetrafluoroethylene unit, and a perfluoroalkyl vinyl ether unit, the copolymer containing 96.0 to 97.4 mol % of the chlorotrifluoroethylene unit and the tetrafluoroethylene unit relative to all the monomer units constituting the copolymer and 2.6 to 4.0 mol % of the perfluoroalkyl vinyl ether unit relative to all the monomer units constituting the copolymer.

The perfluoroalkyl vinyl ether is preferably represented by the following formula:

$$CF_2=CF-O-Rf$$

wherein Rf is a C1-C5 perfluoroalkyl group.

The rubber layer (A) preferably contains a non-fluoroelastomer.

The rubber layer (A) preferably contains at least one non-fluoroelastomer selected from the group consisting of acrylonitrile-butadiene rubber, a hydride of acrylonitrile-butadiene rubber, epichlorohydrin rubber, acrylic rubber, and a rubber blend of two or more thereof.

The invention also relates to a copolymer for use in production of the above laminate, the copolymer containing 96.0 to 97.4 mol % of a chlorotrifluoroethylene unit and a tetrafluoroethylene unit relative to all the monomer units constituting the copolymer and 2.6 to 4.0 mol % of a perfluoroalkyl vinyl ether unit relative to all the monomer units constituting the copolymer.

Advantageous Effects of Invention

In the laminate of the invention having any of the above structures, the rubber layer and the fluororesin layer are firmly bonded to each other, and the fluororesin layer has low fuel permeability and is less likely to suffer solvent cracking.

The copolymer of the invention having the above structure can provide a laminate including a rubber layer and a fluororesin layer in which the rubber layer and the fluororesin layer are firmly bonded to each other and the fluororesin layer has low fuel permeability and is less likely to suffer solvent cracking.

DESCRIPTION OF EMBODIMENTS

The invention will be specifically described hereinbelow.

The laminate of the invention includes a rubber layer (A) and a fluororesin layer (B).

The fluororesin layer (B) is a layer that contains a copolymer containing a chlorotrifluoroethylene (CTFE) unit, a tetrafluoroethylene (TFE) unit, and a perfluoroalkyl vinyl ether unit. The copolymer contains 96.0 to 97.4 mol % of the CTFE unit and the TFE unit relative to all the monomer units constituting the copolymer and 2.6 to 4.0 mol % of the perfluoroalkyl vinyl ether unit relative to all the monomer units constituting the copolymer. In other words, the copolymer is characterized by containing specific amounts of the CTFE unit, the TFE unit, and the perfluoroalkyl vinyl ether unit. This feature allows the fluororesin layer (B) to have low fuel permeability and to be less likely to suffer solvent cracking. Further, this feature allows the fluororesin layer (B) to be firmly bonded to the rubber layer (A).

In order to achieve low fuel permeability and excellent solvent cracking resistance and adhesiveness, the copolymer preferably contains 96.5 to 97.4 mol % of the CTFE unit and the TFE unit relative to all the monomer units constituting the copolymer and 2.6 to 3.5 mol % of the perfluoroalkyl vinyl ether unit relative to all the monomer units constituting the copolymer, more preferably contains 96.7 to 97.4 mol % of the CTFE unit and the TFE unit and 2.6 to 3.3 mol % of the perfluoroalkyl vinyl ether unit relative to all the monomer units constituting the copolymer, still more preferably contains 96.7 to 97.3 mol % of the CTFE unit and the TFE unit and 2.7 to 3.3 mol % of the perfluoroalkyl vinyl ether unit relative to all the monomer units constituting the copolymer, most preferably contains 96.8 to 97.3 mol % of the CTFE unit and the TFE unit and 2.7 to 3.2 mol % of the perfluoroalkyl vinyl ether unit relative to all the monomer units constituting the copolymer.

In the copolymer, the CTFE unit and the TFE unit preferably give a mole ratio (CTFE unit/TFE unit) of (15 to 90)/(85 to 10), more preferably (15 to 50)/(85 to 50), still more preferably (15 to 25)/(85 to 75).

In the present description, the amounts of the monomer units in the copolymer are values obtainable by any combination of $^{19}$F-NMR analysis, infrared spectroscopy (IR), elemental analysis, and X-ray fluorescence analysis in accordance with the types of the monomers.

The perfluoroalkyl vinyl ether is preferably one represented by the following formula:

$$CF_2=CF-O-Rf$$

(wherein Rf is a C1-C5 perfluoroalkyl group), more preferably at least one selected from the group consisting of perfluoro(methyl vinyl ether), perfluoro(ethyl vinyl ether), and perfluoro(propyl vinyl ether), still more preferably perfluoro(propyl vinyl ether).

The copolymer may further contain 0 to 1.4 mol %, preferably 0 to 0.8 mol %, of a unit based on a different monomer relative to all the monomer units constituting the copolymer. Examples of the different monomer include ethylene, vinylidene fluoride, vinyl monomers represented by $CX^1X^2=CX^3(CF_2)_nX^4$ (wherein $X^1$, $X^2$, and $X^3$ are the same as or different from each other, and are each a hydrogen atom or a fluorine atom; $X^4$ is a hydrogen atom, a fluorine atom, or a chlorine atom; and n is an integer of 1 to 10), and alkyl perfluorovinyl ether derivatives represented by $CF_2=CF-OCH_2-Rf^2$ (wherein $Rf^2$ is a C1-C5 perfluoroalkyl group).

The copolymer may contain at least one reactive functional group selected from the group consisting of a carbonyl group, a hydroxy group, a heterocyclic group, and an amino group introduced into an end of the main chain and/or of a side chain of the polymer.

The term "carbonyl group" as used herein means a group of divalent carbon composed of a carbon-oxygen double bond, and is typified by —C(=O)—. Examples of a reactive functional group containing a carbonyl group include, but are not limited to, those containing a carbonyl group as a moiety of the chemical structure, such as a carbonate group, a carboxylic halide group (halogenoformyl group), a formyl group, a carboxy group, an ester bond (—C(=O)O—), an acid anhydride bond (—C(=O)O—C(=O)—), an isocyanate group, an amide group, an imide group (—C(=O)—NH—C(=O)—), a urethane bond (—NH—C(=O)O—), a carbamoyl group (NH$_2$—C(=O)—), a carbamoyloxy group (NH$_2$—C(=O)O—), a ureido group (NH$_2$—C(=O)—NH—), and an oxamoyl group (NH$_2$—C(=O)—C(=O)—).

In groups such as an amide group, an imide group, a urethane bond, a carbamoyl group, a carbamoyloxy group, a ureido group, and an oxamoyl group, a hydrogen atom binding to the nitrogen atom thereof may be replaced by a hydrocarbon group such as an alkyl group.

In order to achieve easy introduction and to give moderate heat resistance and good adhesiveness at relatively low temperatures to the copolymer, the reactive functional group is preferably an amide group, a carbamoyl group, a hydroxy group, a carboxy group, a carbonate group, a carboxylic halide group, or an acid anhydride bond, more preferably an amide group, a carbamoyl group, a hydroxy group, a carbonate group, a carboxylic halide group, or an acid anhydride bond.

Particularly preferred are those containing a carbonate group and/or a carboxylic halide group as described in WO 99/45044.

The copolymer may contain a polymer that contains a reactive functional group at either an end of the main chain or a side chain of the polymer, or may contain a polymer that contains a reactive functional group at both of an end of the main chain and a side chain. When the reactive functional group is present at an end of the main chain, it may be present at both ends of the main chain or may be present at either end. The reactive functional group, when containing an ether bond, may be further present in the main chain.

In order to prevent significant reduction in mechanical properties and chemical resistance and to achieve advantageous productivity and cost efficiency, the copolymer preferably contains a polymer that contains a reactive functional group at an end of the main chain.

The number of the reactive functional groups may appropriately be selected in accordance with factors such as the types and shapes of rubber layers to be stacked, the purpose of bonding, the application of the product, the adhesiveness required, and the method of bonding to an adjacent layer.

The number of the reactive functional groups present at the ends of the main chain and/or the ends of the side chains is preferably 3 to 800 per 1×10$^6$ carbon atoms in the main chain. Less than 3 reactive functional groups per 1×10$^6$ carbon atoms in the main chain may cause poor adhesiveness. The lower limit thereof is more preferably 15, still more preferably 30, particularly preferably 90, most preferably 120. In order to achieve good productivity, the upper limit of the number of the reactive functional groups at the ends is more preferably 200, for example.

The number of the reactive functional groups at the ends is calculated as follows. Powder of the copolymer is compression-molded at a molding temperature higher than the melting point thereof by 50° C. and a molding pressure of 5 MPa to provide a film sheet having a thickness of 0.25 to 0.30 mm. This sheet is subjected to infrared absorption spectrum analysis using an infrared spectrophotometer. The resulting infrared absorption spectrum is compared with the infrared absorption spectrum of a known film to determine the type of the characteristic absorption of the reactive functional group. Then, using the corresponding difference spectrum, the number of the reactive functional groups is calculated by the following formula.

Number of end groups (per $1\times10^6$ carbon atoms in the main chain)=$(1\times K)/t$ l: absorbance
K: correction coefficient
t: film thickness (mm)

The correction coefficients of the target end reactive functional groups are shown in Table 1.

TABLE 1

| End group | Absorption frequency (cm$^{-1}$) | Correction coefficient |
|---|---|---|
| —OC(=O)O—R | 1817 | 1426 |
| —COF | 1884 | 405 |
| —COOH | 1813, (1795-1792), 1775 | 455 |
| —COOCH$_3$ | 1795 | 355 |
| —CONH$_2$ | 3438 | 408 |
| —CH$_2$OH | 3648 | 2325 |

The correction coefficients in Table 1 are values determined from the infrared absorption spectrum of a model compound so as to calculate the number of end groups per $1\times10^6$ carbon atoms in the main chain.

Examples of a method of introducing a reactive functional group into an end of the main chain and/or of a side chain include: a method of copolymerizing a reactive functional group-containing monomer ((3); a method of using a compound containing or generating a reactive functional group as a polymerization initiator; a method of using a compound containing or generating a reactive functional group as a chain transfer agent; a method of introducing a reactive functional group into a fluoropolymer by a polymeric reaction; and a method of combining any of these methods.

The reactive functional group-containing monomer 03) in the case of introducing a reactive functional group by copolymerization may be any monomer that is copolymerizable with the monomers to provide the copolymer and contains the reactive functional group. Specific examples thereof include the following.

A first group of the monomer 03) includes aliphatic unsaturated carboxylic acids disclosed in WO 2005/100420. Unsaturated carboxylic acids preferably contain at least one polymerizable carbon-carbon unsaturated bond in a molecule and at least one carbonyloxy group (—C(=O)—O—) in a molecule.

The aliphatic unsaturated carboxylic acids may be aliphatic unsaturated monocarboxylic acids or may be aliphatic unsaturated polycarboxylic acids containing two or more carboxy groups. Examples of the aliphatic unsaturated monocarboxylic acids include C3-C6 unsaturated aliphatic monocarboxylic acids such as (meth)acrylic acid and crotonic acid.

Examples of the aliphatic unsaturated polycarboxylic acids include C3-C6 unsaturated aliphatic polycarboxylic acids such as maleic acid, fumaric acid, itaconic acid, citraconic acid, mesaconic acid, aconitic acid, maleic anhydride, itaconic anhydride, and citraconic anhydride.

A second group of the monomer (1) includes unsaturated compounds represented by the following formula:

$$CX^7{}_2=CY^1-(Rf^4)_n-Z^1$$

wherein $Z^1$ is the reactive functional group; $X^7$ and $Y^1$ are the same as or different from each other, and are each a hydrogen atom or a fluorine atom; $Rf^4$ is a C1-C40 alkylene group, a C1-C40 fluorine-containing oxyalkylene group, a C2-C40 fluorine-containing alkylene group containing an ether bond, or a C2-C40 fluorine-containing oxyalkylene group containing an ether bond; and n is 0 or 1.

The proportion of the reactive functional group-containing monomer (β) unit introduced by copolymerization is preferably 0.05 mol % or more, more preferably 0.1 mol % or more. Too large an amount of the functional group-containing monomer is likely to cause gelling and vulcanization reactions during heat-melting. Thus, the upper limit thereof is preferably 5 mol %, more preferably 3 mol %, particularly preferably 1.4 mol %.

The copolymer may contain a heterocyclic group or an amino group at an end of the main chain or an end of a side chain of the polymer.

The heterocyclic group is a group containing a hetero atom (e.g., nitrogen atom, sulfur atom, oxygen atom) in the heterocyclic moiety, and may be a saturated ring or an unsaturated ring, and may be a single ring or a fused ring. Preferred among the heterocyclic groups is an oxazolyl group.

The amino group is a monovalent functional group obtainable by removing hydrogen from ammonia or a primary or secondary amine. Specific examples thereof include groups represented by the following formula:

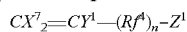

(wherein $R^4$ and $R^5$ may be the same as or different from each other, and are each a hydrogen atom or a C1-C20 monovalent organic group). Specific examples of the amino group include —NH$_2$, —NH(CH$_3$), —N(CH$_3$)$_2$, —NH(CH$_2$CH$_3$), —N(C$_2$H$_5$)$_2$, and —NH(C$_6$H$_5$).

The copolymer may be obtainable by any conventionally known polymerization method such as suspension polymerization, solution polymerization, emulsion polymerization, or bulk polymerization. In the polymerization, the conditions such as the temperature and the pressure, a polymerization initiator and other additives may appropriately be selected in accordance with the composition and amount of the copolymer.

The copolymer preferably has a melting point of 160° C. to 270° C., although not limited thereto.

The melting point of the copolymer is defined as the temperature corresponding to the maximum value on a heat-of-fusion curve obtained by increasing the temperature at a rate of 10° C./min using a DSC device (Seiko Instruments Inc.). The MFR was determined as the weight (g) of the polymer that flows out of a nozzle having a diameter of 2 mm and a length of 8 mm per unit time (10 minutes) at a predetermined temperature and a load of 5 kg using a melt indexer (Toyo Seiki Seisaku-sho, Ltd.).

The copolymer preferably has a molecular weight that allows the resulting molded article to exert characteristics such as good mechanical properties and low fuel permeability. For example, with the melt flow rate (MFR) taken as an indicator of the molecular weight, the MFR is preferably 0.5 to 100 g/10 min at any temperature (e.g., 297° C.) within the range of about 230° C. to 350° C., which is a common molding temperature range for fluoropolymers.

Examples of the polymerization initiator to be used include oil-soluble radical polymerization initiators typified by peroxy carbonates such as diisopropyl peroxydicarbonate (IPP) and di-n-propyl peroxydicarbonate (NPP) and water-soluble radical polymerization initiators such as ammonium salts, potassium salts, and sodium salts of persulfuric acid, perboric acid, perchloric acid, perphosphoric acid, and percarbonic acid. Preferred among these is di-n-propyl peroxydicarbonate (NPP).

In order to achieve good dispersibility and uniformity inside the system, the chain transfer agent is preferably at least one selected from the group consisting of C1-C4 water-soluble alcohols, C1-C4 hydrocarbons, C1-C4 fluorinated hydrocarbons, and persulfuric acid salts. The chain transfer agent is more preferably at least one selected from the group consisting of methane, ethane, n-butane, isobutane, methanol, n-propyl alcohol, HFC-134a, HFC-32, DSP, APS, and KPS, still more preferably at least one selected from the group consisting of n-propyl alcohol, methanol, and isobutane.

The fluororesin layer (B) may contain one or two or more of the copolymers.

The fluororesin layer (B) preferably has a fuel permeability of 10 g·mm/m$^2$/day or lower, more preferably 1.0 g·mm/m$^2$/day or lower, still more preferably 0.6 g·mm/m$^2$/day or lower, most preferably 0.5 g·mm/m$^2$/day or lower.

The fuel permeability is a value calculated as follows. A sheet obtained from the target resin is put into a cup for fuel permeability measurement containing a solvent mixture of isooctane, toluene, and ethanol at a volume ratio of 45:45:10. Then, the mass change is determined at 60° C. and the fuel permeability is calculated therefrom.

The copolymer can lead to better chemical resistance and lower fuel permeability when it is a perhalo polymer. The perhalo polymer is a polymer in which every carbon atom constituting the main chain of the polymer is coupled with a halogen atom.

The fluororesin layer (B) may further contain any of various fillers such as inorganic powder, glass fibers, carbon powder, carbon fibers, aramid fibers, and metal oxides in accordance with the purpose and application thereof to the extent that does not impair the performance thereof.

For example, in order to further lower the fuel permeability, smectite-type lamellar viscous minerals such as montmorillonite, beidellite, saponite, nontronite, hectorite, sauconite, and stevensite and high aspect ratio fine lamellar minerals such as mica may be added.

In order to impart conductivity, a conductive filler may be added. Examples of the conductive filler include, but are not limited to, powder or fiber of conductive simple substance such as metal or carbon; powder of a conductive compound such as zinc oxide; and powder whose surface is subjected to conductivity-imparting treatment. In the case of adding a conductive filler, the filler is preferably melt-kneaded into pellets in advance.

Examples of the powder or fiber of conductive simple substance include, but are not limited to, powder of metal such as copper or nickel; fiber of metal such as iron or stainless steel; and carbon black, carbon fiber, carbon fibril described in JP H03-174018 A, and carbon nanotube.

The powder whose surface is subjected to conductivity-imparting treatment is powder obtainable by subjecting the surface of non-conductive powder such as glass beads or titanium oxide to conductivity-imparting treatment.

Examples of the conductivity-imparting treatment on the surface include, but are not limited to, metal sputtering and electroless plating.

Carbon black is suitably used among the above conductive fillers because it is advantageous to economic efficiency and prevention of storage of static electricity.

The fluororesin layer (B) containing a conductive filler preferably has a volume resistivity of $1 \times 10^0$ to $1 \times 10^9$ Ω·cm. The lower limit thereof is more preferably $1 \times 10^2$ Ω·cm, still more preferably $1 \times 10^6$ Ω·cm, particularly preferably $1 \times 10^7$ Ω·cm, while the upper limit thereof is most preferably $1 \times 10^8$ Ω·cm.

In addition to the filler, any other appropriate additives such as a thermal stabilizer, a reinforcing agent, an ultra-violet absorber, and a pigment may be added.

The rubber layer (A) is a layer containing at least rubber, and may contain a fluoroelastomer or a non-fluoroelastomer. The rubber is preferably one obtainable by crosslinking uncrosslinked rubber.

Examples of the non-fluoroelastomer include diene rubber such as acrylonitrile-butadiene rubber (NBR) and hydrides thereof (HNBR), styrene-butadiene rubber (SBR), chloroprene rubber (CR), butadiene rubber (BR), natural rubber (NR), and isoprene rubber (IR), ethylene-propylene-termonomer copolymerized rubber, silicone rubber, butyl rubber, epichlorohydrin rubber, acrylic rubber, and rubber blends of two or more thereof.

In order to achieve good heat resistance, oil resistance, weather resistance, and extrusion moldability, the non-fluoroelastomer is preferably at least one non-fluoroelastomer selected from the group consisting of diene rubber, epichlorohydrin rubber, acrylic rubber, and rubber blends of two or more thereof, more preferably at least one non-fluoroelastomer selected from the group consisting of acrylonitrile-butadiene rubber, hydrides of acrylonitrile-butadiene rubber, epichlorohydrin rubber, acrylic rubber, and rubber blends of two or more thereof, still more preferably at least one non-fluoroelastomer selected from the group consisting of acrylonitrile-butadiene rubber, epichlorohydrin rubber, acrylic rubber, and rubber blends of two or more thereof, most preferably at least one non-fluoroelastomer selected from the group consisting of acrylonitrile-butadiene rubber, epichlorohydrin rubber, acrylic rubber, and a blend of acrylonitrile-butadiene rubber and acrylic rubber.

The presence of the acrylonitrile-butadiene rubber (NBR) can lead to good cold resistance, heat resistance, oil resistance, weather resistance, and extrusion moldability, and is advantageous for cost efficiency. The NBR preferably has a bound acrylonitrile content of 18 to 50% by mass, more preferably 25 to 50% by mass. Too low a bound acrylonitrile content may cause insufficient gasoline resistance, while too high a bound acrylonitrile content may be disadvantageous for cost efficiency.

The epichlorohydrin rubber (ECO) may be any one containing a polymerized unit based on epichlorohydrin, and may be a homopolymer consisting essentially of a polymerized unit based on epichlorohydrin or may be a copolymer of two or more monomers including a polymerized unit based on epichlorohydrin and a polymerized unit based on a different monomer other than epichlorohydrin.

The different monomer other than epichlorohydrin is preferably at least one monomer selected from the group consisting of ethylene oxide, propylene oxide, and allyl glycidyl ether. The epichlorohydrin rubber is preferably a polymer containing a polymerized unit based on epichlorohydrin and a polymerized unit based on ethylene oxide, more preferably a polymer containing a polymerized unit based on epichlorohydrin, a polymerized unit based on ethylene oxide, and a polymerized unit based on allyl glycidyl ether.

The epichlorohydrin rubber is preferably at least one polymer selected from the group consisting of an epichlorohydrin homopolymer, an epichlorohydrin/ethylene oxide copolymer, an epichlorohydrin/allyl glycidyl ether copolymer, an epichlorohydrin/ethylene oxide/allyl glycidyl ether copolymer, an epichlorohydrin/propylene oxide copolymer, an epichlorohydrin/propylene oxide/allyl glycidyl ether copolymer, and an epichlorohydrin/ethylene oxide/propylene oxide/allyl glycidyl ether quaterpolymer, more preferably at least one polymer selected from the group consisting of an epichlorohydrin/ethylene oxide copolymer and an epichlorohydrin/ethylene oxide/allyl glycidyl ether copolymer. One of these may be used alone or two or more thereof may be used in the form of a mixture.

In order to achieve heat resistance, the epichlorohydrin rubber preferably contains 20 mol % or more, more preferably 30 mol % or more, particularly preferably 40 mol % or more, of the polymerized unit based on epichlorohydrin. The amount of the polymerized unit based on epichlorohydrin can be calculated from the chlorine content, for example. The chlorine content can be determined by potentiometric titration in accordance with the method described in JIS K7229.

The rubber layer (A) is preferably one formed from a vulcanizable rubber composition containing an uncrosslinked rubber (b1) of the rubber.

Examples of the vulcanizable rubber composition include vulcanizable rubber compositions disclosed in JP 2012-126015 A, WO 2011/001756, JP 2010-89479 A, JP 2012-61644 A, JP 2012-81682 A, WO 2012/063893, JP 2013-176961 A, JP 2013-099935 A, and WO 2013/089200.

The vulcanizable rubber composition preferably contains the unvulcanized rubber (b1), a compound (b2), and an acid acceptor (b3) as essential components, and at least one selected from a silica (b4), a vulcanizing agent (b5), and a metal salt (b6) as an optional component.

In particular, the vulcanizable rubber composition containing a vulcanizing agent (b5) and a metal salt (b6) in addition to the unvulcanized rubber (b1) and the compound (b2) can more firmly bind to an adjacent layer. The vulcanizable rubber composition also preferably contains an epoxy resin (b7).

The vulcanizable rubber composition may contain a resin in order to give the rubber layer (A) a characteristic different from that achieved by the unvulcanized rubber (b1). Examples of the resin include PVC, chlorinated polystyrene, chlorosulfonated polystyrene ethylene, and ethylene/vinyl acetate copolymers. The vulcanizable rubber composition containing NBR and PVC can improve the ozone resistance. In this case, the amount of PVC is preferably 10 to 70 parts by mass relative to 100 parts by mass of NBR.

The compound (b2) is preferably at least one compound selected from the group consisting of a 1,8-diazabicyclo(5.4.0)undecene-7 salt (DBU salt), a 1,5-diazabicyclo(4.3.0)-nonene-5 salt (DBN salt), 1,8-diazabicyclo(5.4.0)undecene-7 (DBU), and 1,5-diazabicyclo(4.3.0)-nonene-5 (DBN). The presence of the compound (b2) can improve the vulcanizing performance of the vulcanizable rubber composition.

The DBU salt and the DBN salt each may be a carbonate, a long-chain aliphatic carboxylate, an aromatic carboxylate, an orthophthalate, a p-toluenesulfonate, a phenoxide, a phenol resin salt, a naphthoate, an octylate, an oleate, a formate, or a phenol novolac resin salt of DBU or DBN, and are each preferably at least one compound selected from the group consisting of 8-benzyl-1,8-diazabicyclo(5.4.0)-7-undecenium chloride (DBU-B), a naphthoate, an orthophthalate, a phenoxide, and a formate.

Specifically, the compound (b2) is preferably at least one compound selected from the group consisting of 1,8-diazabicyclo(5.4.0)undecene-7, 1,5-diazabicyclo(4.3.0)nonene-5, 8-benzyl-1,8-diazabicyclo(5.4.0)-7-undecenium chloride, a naphthoate of 1,8-diazabicyclo(5.4.0)undecene-7, a phenoxide of 1,8-diazabicyclo(5.4.0)undecene-7, an orthophthalate of 1,8-diazabicyclo(5.4.0)undecene-7, and a formate of 1,8-diazabicyclo(5.4.0)undecene-7.

The compound (b2) is more preferably at least one compound selected from the group consisting of 1,8-diazabicyclo(5.4.0)undecene-7, 1,5-diazabicyclo(4.3.0)nonene-5, 8-benzyl-1,8-diazabicyclo(5.4.0)-7-undecenium chloride, a phenoxide of 1,8-diazabicyclo(5.4.0)undecene-7, an orthophthalate of 1,8-diazabicyclo(5.4.0)undecene-7, and a formate of 1,8-diazabicyclo(5.4.0)undecene-7, still more preferably at least one compound selected from the group consisting of 8-benzyl-1,8-diazabicyclo(5.4.0)-7-undecenium chloride, a formate of 1,8-diazabicyclo(5.4.0)undecene-7, and a phenoxide of 1,8-diazabicyclo(5.4.0)undecene-7.

In one preferred embodiment, the compound (b2) is at least one compound selected from the group consisting of DBU-B, a phenoxide of DBU, an orthophthalate of DBU, and a formate of DBU.

The amount of the compound (b2) is preferably more than 0.3 parts by mass and 5 parts by mass or less relative to 100 parts by mass of the unvulcanized rubber (b1). The amount of the compound (b2) is more preferably 0.5 parts by mass or more relative to 100 parts by mass of the unvulcanized rubber (b1). Too small an amount of the compound (b2) may cause insufficient adhesiveness. The amount of the compound (b2) is more preferably 4 parts by mass or less, still more preferably 3.5 parts by mass or less, particularly preferably 3 parts by mass or less, relative to 100 parts by mass of the unvulcanized rubber (b1).

The vulcanizable rubber composition preferably contains an acid acceptor (b3). Examples of the acid acceptor (b3) include metal oxides, basic lead phosphite, Ca—Mg—Zn, Ba—Mg—Zn, Ca—Zn—Sn, or Ba—Zn composite stabilizers, fatty acid metal soaps, inorganic acid salts, organotin compounds, hydrotalcite, baked hydrotalcite, and inorganic microporous crystals. These may be used alone or in combination of two or more thereof.

Specific examples of the acid acceptor (b3) used include sodium stearate, potassium stearate, calcium stearate, Ca—Mg—Zn composite acid acceptors, Ba—Zn composite acid acceptors, hydrotalcite, magnesium oxide, zinc oxide, lead oxide, calcium carbonate, magnesium carbonate, calcium hydroxide, and magnesium silicate. These may be used alone or in combination of two or more thereof. The acid acceptor (b3) is preferably magnesium oxide.

In order to achieve good adhesiveness and rubber physical properties, the amount of the acid acceptor (b3) is preferably 0.1 to 50 parts by mass, particularly preferably 1 to 20 parts by mass, relative to 100 parts by mass of the unvulcanized rubber (b1). The laminate of the invention having the specific structure can have excellent adhesiveness with the presence of the acid acceptor (b3) as an essential component.

The vulcanizable rubber composition preferably contains a silica (b4). The silica (b4) may be a basic silica or an acidic silica. In order to achieve good adhesiveness, a basic silica is preferred. The basic silica may be Carplex 1120 (DSL. Japan Co., Ltd.). In order to achieve good adhesiveness and rubber physical properties, the amount thereof is preferably 10 to 100 parts by mass, particularly preferably 15 to 70 parts by mass, relative to 100 parts by mass of the unvulcanized rubber (b1).

The vulcanizing agent (b5) used may be a conventionally known one in accordance with the vulcanization system of the vulcanizable rubber composition. Vulcanization of the unvulcanized rubber (b1) can improve the mechanical strength such as tensile strength of the resulting vulcanized rubber layer and can provide good elasticity.

The vulcanization system which may be used in the invention may be any of a sulfur vulcanization system, a polyamine vulcanization system, a polyol vulcanization system, a peroxide vulcanization system, an imidazole vulcanization system, a triazine vulcanization system, an oxazole vulcanization system, and a thiazole vulcanization system. It may be appropriately selected in accordance with the type of a vulcanizable group (cure site) when the unvulcanized rubber contains a cure site, or with the properties provided for the vulcanized laminate and the application thereof.

The vulcanizing agent (b5) used may be any of a sulfur vulcanization system vulcanizing agent, a polyamine vulcanization system vulcanizing agent, a polyol vulcanization system vulcanizing agent, a peroxide vulcanization system vulcanizing agent, an imidazole vulcanization system vulcanizing agent, a triazine vulcanization system vulcanizing agent, an oxazole vulcanization system vulcanizing agent, and a thiazole vulcanization system vulcanizing agent, in accordance with the vulcanization system. These may be used alone or in combination.

For the unvulcanized rubber (b1) which is a diene-type non-fluoroelastomer (e.g., NBR, SBR, BR), for example, the sulfur vulcanization system or the peroxide vulcanization system is used in usual cases. Thus, the vulcanizing agent is preferably at least one selected from the group consisting of a sulfur vulcanization system vulcanizing agent and a peroxide vulcanization system vulcanizing agent.

Examples of the sulfur vulcanization system vulcanizing agent include powdery sulfur, precipitated sulfur, colloidal sulfur, surface-treated sulfur, insoluble sulfur, sulfur chloride, sulfur dichloride, disulfide compounds, and polysulfide compounds.

The amount of the sulfur vulcanization system vulcanizing agent is preferably 0.1 to 10 parts by mass relative to 100 parts by mass of the unvulcanized rubber (b1). Too small an amount thereof tends to cause insufficient adhesiveness, while too large an amount thereof tends to cause excessive hardness.

Preferred examples of the peroxide vulcanization system vulcanizing agent include organic peroxides that easily generate peroxy radicals in the presence of heat or a redox system.

Examples of the organic peroxides include 1,1-bis(t-butylperoxy)-3,5,5-trimethylcyclohexane, 2,5-dimethylhexane-2,5-dihydroxyperoxide, di-t-butyl peroxide, t-butyl cumyl peroxide, dicumyl peroxide, α,α'-bis(t-butylperoxy)-p-diisopropylbenzene, 2,5-dimethyl-2,5-di(t-butylperoxy)hexane, 2,5-dimethyl-2,5-di(t-butylperoxy)hexyne-3, benzoyl peroxide, t-butylperoxybenzene, 2,5-dimethyl-2,5-di(benzoylperoxy)hexane, t-butylperoxymaleic acid, and t-butylperoxy isopropyl carbonate. Preferred are dialkyl compounds. The type and amount thereof is usually selected in accordance with factors such as the amount of active —O═O— and the decomposition temperature. The amount thereof is usually 0.1 to 15 parts by mass, preferably 0.3 to 5 parts by mass, relative to 100 parts by mass of the unvulcanized rubber.

The vulcanizing agent (b5) is preferably at least one selected from the group consisting of a sulfur vulcanization system vulcanizing agent and a peroxide vulcanization system vulcanizing agent, more preferably a sulfur vulcanization system vulcanizing agent. The amount thereof is preferably 0.5 to 5 parts by mass, particularly preferably 1.0 to 3 parts by mass, relative to 100 parts by mass of the unvulcanized rubber (b1).

The metal salt (b6) is preferably at least one selected from the group consisting of a metal carbamate and a thiazole-type metal salt.

Examples of the metal carbamate include zinc dimethyldithiocarbamate (ZnMDC), zinc diethyldithiocarbamate (ZnEDC), zinc dibutyldithiocarbamate (ZnBDC), iron dimethyldithiocarbamate (FeMDC), zinc ethylphenyldithiocarbamate (ZnEPDC), zinc N-pentamethylenedithiocarbamate, zinc dibenzyldithiocarbamate, sodium dimethyldithiocarbamate (NaMDC), sodium diethyldithiocarbamate (NaEDC), sodium dibutyldithiocarbamate (NaBDC), copper dimethyldithiocarbamate (CuMDC), nickel dibutyldithiocarbamate (NiMDC), and tellurium diethyldithiocarbamate (TeEDC). These may be used alone or in combination of two or more thereof. In order to achieve good adhesiveness and rubber physical properties, preferred among these is ZnMDC, ZnEDC, NiMDC, CuMDC or ZnBDC.

The thiazole-type metal salt used is preferably zinc mercaptobenzothiazole (ZnMBT).

The amount of the metal salt (b6) is preferably 0.01 to 5 parts by mass, more preferably 0.01 to 3 parts by mass, particularly preferably 0.05 to 2 parts by mass, relative to 100 parts by mass of the unvulcanized rubber (a1). Too small an amount of the metal salt (b6) tends to cause poor vulcanized rubber physical properties, while too large an amount thereof tends to cause poor unvulcanized physical properties.

In order to prevent inhibition of vulcanizing performance and impairment of rubber physical properties, the vulcanizable rubber composition is preferably free from an amine compound.

In the invention, any common additives usually added to vulcanizable rubber compositions may be added in accordance with the purpose or the necessity. Examples thereof include a variety of additives such as a filler, a processing aid, a plasticizer, a softening agent, an antioxidant, a colorant, a stabilizer, an adhesive aid, a release agent, a conductivity-imparting agent, a thermal-conductivity-imparting agent, a surface non-adhesive agent, a tackifier, a flexibility-imparting agent, a heat resistance improver, a flame retarder, an ultraviolet absorber, an oil resistance improver, a blowing agent, a scorch inhibitor, a lubricant, and an epoxy resin. One or two or more of common vulcanizing agents and vulcanization accelerators other than the above may also be added.

Examples of the filler include metal oxides such as calcium oxide, titanium oxide, and aluminum oxide; metal hydroxides such as magnesium hydroxide, aluminum hydroxide, and calcium hydroxide; carbonates such as magnesium carbonate, aluminum carbonate, calcium carbonate, and barium carbonate; silicates such as magnesium silicate, calcium silicate, sodium silicate, and aluminum silicate; sulfates such as aluminum sulfate, calcium sulfate, and barium sulfate; synthetic hydrotalcite, metal sulfides such as molybdenum disulfide, iron sulfide, and copper sulfide; diatomite, asbestos, lithopone (zinc sulfide/barium sulfide), graphite, carbon black, carbon fluoride, calcium fluoride, coke, quartz fine powder, zinc white, talc, mica powder, wollastonite, carbon fiber, aramid fiber, a variety of whiskers, glass fiber, organic reinforcing agents, and organic filler.

Examples of the processing aid include higher fatty acids such as stearic acid, oleic acid, palmitic acid, and lauric acid; higher fatty acid salts such as sodium stearate and zinc stearate; higher fatty acid amides such as stearamide and oleamide; higher fatty acid esters such as ethyl oleate; higher aliphatic amines such as stearyl amine and oleyl amine; petroleum-based waxes such as carnauba wax and ceresin wax; polyglycols such as ethylene glycol, glycerol, and diethylene glycol; aliphatic hydrocarbons such as vaselline and paraffin; silicone oils, silicone polymers, low molecular weight polyethylene, phthalic acid esters, phosphoric acid esters, rosin, (halogenated) dialkyl amines, (halogenated) dialkyl sulfones, and surfactants.

Examples of the plasticizer include phthalic acid derivatives and sebacic acid derivatives. Examples of the softening agent include lubricating oil, process oil, coal tar, castor oil, and calcium stearate. Examples of the antioxidant include phenylenediamines, phosphates, quinolines, cresols, phenols, and dithiocarbamate metal salts.

Examples of the epoxy resin (b7) include bisphenol A epoxy resins, bisphenol F epoxy resins, and multifunctional epoxy resins. In order to achieve good chemical resistance and adhesiveness, preferred are bisphenol A epoxy resins, particularly preferred are epoxy resins represented by the following formula (1).

[Chem. 1]

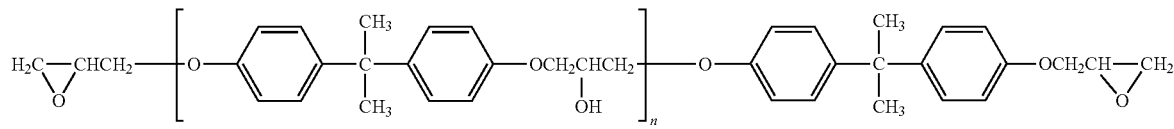

(1)

In the formula (1), n represents an average value, and is preferably 0.1 to 3, more preferably 0.1 to 0.5, still more preferably 0.1 to 0.3. If n is smaller than 0.1, the adhesiveness to an adjacent layer tends to be low. If n is greater than 3, the epoxy resin itself tends to have high viscosity and be difficult to disperse uniformly in the vulcanizable rubber composition.

In order to further improve the adhesiveness to an adjacent layer, the amount of the epoxy resin when added is preferably 1 part by mass or more, more preferably 2 parts by mass or more, particularly preferably 3 parts by mass or more, relative to 100 parts by mass of the unvulcanized rubber. In order not to harden the rubber layer excessively, the amount thereof is preferably 25 parts by mass or less, more preferably 15 parts by mass or less, particularly preferably 10 parts by mass or less, relative to 100 parts by mass of the unvulcanized rubber.

The vulcanizable rubber composition may be prepared by kneading the unvulcanized rubber (b1), the compound (b2), and the acid acceptor (b3), and optionally the silica (b4), the vulcanizing agent (b5), and the metal salt (b6), as well as other additives.

The kneading may be performed at 100° C. or lower using an open roll mill, a Banbury mixer, a pressure kneader, or the like.

The vulcanizable rubber composition preferably exhibits an optimum cure time ($T_{90}$) of 18 minutes or shorter, more preferably 15 minutes or shorter, still more preferably 13 minutes or shorter, particularly preferably 11 minutes or shorter. The lower limit of $T_{90}$ may be, but not limited to, 1 minute or longer. The vulcanizable rubber composition having the above structure can exhibit a shortened cure time and provide improved productivity. $T_{90}$ is a value obtained by determining the maximum torque ($M_H$) and the minimum torque ($M_L$) at 160° C., and is determined by $\{(M_H)-(M_L)\} \times 0.9 + M_L$. $M_H$ and $M_L$ are values determined in accordance with JIS K6300-2.

When the unvulcanized rubber (b1) is an epichlorohydrin rubber, the vulcanizable rubber composition preferably contains an epichlorohydrin rubber (b1-1), a compound (b2-1), an acid acceptor (b3-1), and an epoxy resin (b7-1) as essential components and at least one selected from a silica (b4-1), zinc oxide (b8), and a vulcanizing agent (b5-1) as an optional component, or contains the epichlorohydrin rubber (b1-1), the compound (b2-1), the epoxy resin (b7-1), and a water-supporting substance (b9). In particular, the vulcanizable rubber composition containing the vulcanizing agent (b5-1) in addition to the epichlorohydrin rubber (b1-1) and the compound (b2-1) can bind to an adjacent layer with high bond strength.

The epichlorohydrin rubber (b1-1) is preferably at least one polymer selected from the group consisting of an epichlorohydrin homopolymer, an epichlorohydrin/ethylene oxide copolymer, an epichlorohydrin/allyl glycidyl ether copolymer, an epichlorohydrin/ethylene oxide/allyl glycidyl ether copolymer, an epichlorohydrin/propylene oxide copolymer, an epichlorohydrin/propylene oxide/allyl glycidyl ether copolymer, and an epichlorohydrin/ethylene oxide/propylene oxide/allyl glycidyl ether quaterpolymer, more preferably at least one polymer selected from the group consisting of an epichlorohydrin/ethylene oxide copolymer and an epichlorohydrin/ethylene oxide/allyl glycidyl ether copolymer. One of these may be used alone or two or more thereof may be used in the form of a mixture.

The compound (b2-1) is preferably at least one compound selected from the group consisting of a 1,8-diazabicyclo (5.4.0)undecene-7 salt (DBU salt), a 1,5-diazabicyclo (4.3.0)-nonene-5 salt (DBN salt), 1,8-diazabicyclo(5.4.0) undecene-7 (DBU), and 1,5-diazabicyclo(4.3.0)-nonene-5 (DBN).

The compound (b2-1) is preferably at least one compound selected from the group consisting of a p-toluenesulfonate of 1,8-diazabicyclo(5.4.0)undecene-7, a phenoxide of 1,8-diazabicyclo(5.4.0)undecene-7, a phenol resin salt of 1,8-diazabicyclo(5.4.0)undecene-7, an orthophthalate of 1,8-diazabicyclo(5.4.0)undecene-7, a formate of 1,8-diazabicyclo(5.4.0)undecene-7, an octylate of 1,8-diazabicyclo(5.4.0)undecene-7, a p-toluenesulfonate of 1,5-diazabicyclo(4.3.0)-nonene-5, a phenoxide of 1,5-diazabicyclo(4.3.0)-nonene-5, a phenol resin salt of 1,5-diazabicyclo(4.3.0)-nonene-5, an orthophthalate of 1,5-diazabicyclo(4.3.0)-nonene-5, a formate of 1,5-diazabicyclo (4.3.0)-nonene-5, and an octylate of 1,5-diazabicyclo(4.3.0)-nonene-5. The presence of the compound (b2-1) can improve the vulcanizing performance of the vulcanizable rubber composition and can improve the adhesiveness.

The compound (b2-1) is preferably at least one compound selected from the group consisting of 1,8-diazabicyclo (5.4.0)undecene-7, 8-benzyl-1,8-diazabicyclo(5.4.0)-7-undecenium chloride, a p-toluenesulfonate of 1,8-diazabicyclo (5.4.0)undecene-7, a phenoxide of 1,8-diazabicyclo(5.4.0) undecene-7, a phenol resin salt of 1,8-diazabicyclo(5.4.0) undecene-7, an orthophthalate of 1,8-diazabicyclo(5.4.0)

undecene-7, a formate of 1,8-diazabicyclo(5.4.0)undecene-7, and an octylate of 1,8-diazabicyclo(5.4.0)undecene-7.

In order to improve the adhesiveness, the compound (b2-1) is more preferably 1,8-diazabicyclo(5.4.0)undecene-7, 8-benzyl-1,8-diazabicyclo(5.4.0)-7-undecenium chloride, an octylate of 1,8-diazabicyclo(5.4.0)undecene-7, a phenoxide of 1,8-diazabicyclo(5.4.0)undecene-7, an orthophthalate of 1,8-diazabicyclo(5.4.0)undecene-7, and a formate of 1,8-diazabicyclo(5.4.0)undecene-7.

In a preferred embodiment, the vulcanizable rubber composition further contains a phosphonium salt. The presence of a phosphonium salt in combination with the compound (b2-1) can further improve the adhesiveness.

Specifically preferably, for example, the compound (b2-1) is at least one compound selected from the group consisting of 1,8-diazabicyclo(5.4.0)undecene-7, 8-benzyl-1,8-diazabicyclo(5.4.0)-7-undecenium chloride, a phenoxide of 1,8-diazabicyclo(5.4.0)undecene-7, an orthophthalate of 1,8-diazabicyclo(5.4.0)undecene-7, a formate of 1,8-diazabicyclo(5.4.0)undecene-7, and an octylate of 1,8-diazabicyclo(5.4.0)undecene-7, and the vulcanizable rubber composition further contains a phosphonium salt.

The compound (b2-1) is most preferably a phenoxide of 1,8-diazabicyclo(5.4.0)undecene-7.

In order to achieve good adhesiveness, the amount of the compound (b2-1) is preferably 0.5 parts by mass or more and 5 parts by mass or less, more preferably 1 part by mass or more and 4 parts by mass or less, relative to 100 parts by mass of the epichlorohydrin rubber (b1-1). In order to achieve good adhesiveness and vulcanizing performance, the amount of the compound (b2-1) is preferably 1 part by mass or more and 3 parts by mass or less relative to 100 parts by mass of the epichlorohydrin rubber (b1-1).

The vulcanizable rubber composition preferably contains an acid acceptor (b3-1). In order to achieve good adhesiveness and rubber physical properties, the amount of the acid acceptor (b3-1) is preferably 3 to 20 parts by mass, particularly preferably 5 to 15 parts by mass, relative to 100 parts by mass of the epichlorohydrin rubber (b1-1). The laminate of the invention having the specific structure can have excellent adhesiveness with the presence of the acid acceptor (b3-1) as an essential component. The acid acceptor (b3-1) is preferably any of preferred acid acceptors mentioned for the acid acceptor (b3).

The vulcanizable rubber composition preferably contains a silica (b4-1). The silica (b4-1) may be a basic silica or an acidic silica. In order to achieve good adhesiveness, a basic silica is preferred. The basic silica may be Carplex 1120 (DSL. Japan Co., Ltd.). In order to achieve good adhesiveness and rubber physical properties, the amount thereof is preferably 5 to 40 parts by mass, particularly preferably 10 to 25 parts by mass, relative to 100 parts by mass of the epichlorohydrin rubber (b1-1).

The vulcanizable rubber composition preferably contains an epoxy resin (b7-1). Examples of the epoxy resin (b7-1) include those mentioned for the epoxy resin (b7).

In order to further improve the adhesiveness, the amount of the epoxy resin (b7-1) is preferably 0.1 to 5 parts by mass, more preferably 0.3 to 3 parts by mass, relative to 100 parts by mass of the epichlorohydrin rubber (b1-1). In order to improve the adhesiveness, the amount of the epoxy resin (b7-1) is preferably more than 0.5 parts by mass relative to 100 parts by mass of the epichlorohydrin rubber (b1-1), although it depends on the amounts of the components such as the compound (b2-1), the acid acceptor (b3-1), and the silica (b4-1) added to the vulcanizable rubber composition. In a preferred embodiment, the amount thereof is more than 1 part by mass.

In a preferred embodiment, the vulcanizable rubber composition contains more than 2 parts by mass in total of the compound (b2-1) and the epoxy resin (b7-1) relative to 100 parts by mass of the epichlorohydrin rubber (b1-1).

The vulcanizable rubber composition preferably further contains zinc oxide (b8). In order to achieve good adhesiveness and rubber physical properties, the amount of the zinc oxide (b8) is preferably 1 to 20 parts by mass, particularly preferably 3 to 15 parts by mass, relative to 100 parts by mass of the epichlorohydrin rubber (b1-1). The laminate of the invention having the specific structure can have better adhesiveness with the presence of the zinc oxide (b8).

The vulcanizable rubber composition preferably contains a vulcanizing agent (b5-1). The vulcanizing agent used may be any conventionally known one in accordance with the vulcanization system of the vulcanizable rubber composition. Vulcanization of the epichlorohydrin rubber (b1-1) can improve the mechanical strength such as tensile strength of the resulting vulcanized rubber layer and can provide good elasticity.

Examples of the vulcanizing agent (b5-1) include known vulcanizing agents utilizing the reactivity of chlorine atoms, such as polyamine-type vulcanizing agents, thiourea-type vulcanizing agents, thiadiazole-type vulcanizing agents, mercaptotriazine-type vulcanizing agents, pyrazine-type vulcanizing agents, quinoxaline-type vulcanizing agents, and bisphenol-type vulcanizing agents.

For known vulcanizing agents utilizing the reactivity of chlorine atoms, examples of the polyamine-type vulcanizing agent include ethylenediamine, hexamethylenediamine, diethylenetriamine, triethylenetetramine, hexamethylenetetramine, p-phenylenediamine, cumenediamine, N,N'-dicinnamylidene-1,6-hexanediamine, ethylenediamine carbamate, and hexamethylenediamine carbamate.

Examples of the thiourea-type vulcanizing agents include ethylene thiourea, 1,3-diethyl thiourea, 1,3-dibutyl thiourea, and trimethyl thiourea.

Examples of the thiadiazole-type vulcanizing agents include 2,5-dimercapto-1,3,4-thiadiazole and 2-mercapto-1,3,4-thiadiazole-5-thiobenzoate.

Examples of the mercaptotriazine-type vulcanizing agents include 2,4,6-trimercapto-1,3,5-triazine, 1-methoxy-3,5-dimercaptotriazine, 1-hexylamino-3,5-dimercaptotriazine, 1-diethylamino-3,5-dimercaptotriazine, 1-cyclohexaneamino-3,5-dimercaptotriazine, 1-dibutylamino-3,5-dimercaptotriazine, 2-anilino-4,6-dimercaptotriazine, and 1-phenylamino-3,5-dimercaptotriazine.

Examples of the pyrazine-type vulcanizing agents include 2,3-dimercaptopyrazine derivatives. Examples of the 2,3-dimercaptopyrazine derivatives include pyrazine-2,3-dithiocarbonate, 5-methyl-2,3-dimercaptopyrazine, 5-ethylpyrazine-2,3-dithiocarbonate, 5,6-dimethyl-2,3-dimercaptopyrazine, and 5,6-dimethylpyrazine-2,3-dithiocarbonate.

Examples of the quinoxaline-type vulcanizing agents include 2,3-dimercaptoquinoxaline derivatives. Examples of the 2,3-dimercaptoquinoxaline derivatives include quinoxaline-2,3-dithiocarbonate, 6-methylquinoxaline-2,3-dithiocarbonate, 6-ethyl-2,3-dimercaptoquinoxaline, 6-isopropylquinoxaline-2,3-dithiocarbonate, and 5,8-dimethylquinoxaline-2,3-dithiocarbonate.

Examples of the bisphenol-type vulcanizing agents include 4,4'-dihydroxydiphenyl sulfoxide, 4,4'-dihydroxydiphenyl sulfone (bisphenol S), 1,1-cyclohexylidene-bis(4- hydroxybenzene), 2-chloro-1,4-cyclohexylene-bis(4-hydroxybenzene), 2,2-isopropylidene-bis(4-hydroxybenzene) (bisphenol A), hexafluoroisopropylidene-bis(4-hydroxybenzene) (bisphenol AF), and 2-fluoro-1,4-phenylene-bis(4-hydroxybenzene).

In addition to the vulcanizing agent, any of known vulcanization accelerators and retarders may directly be used in the vulcanizable rubber composition in the invention. Examples of the vulcanization accelerators used together with a known vulcanizing agent utilizing the reactivity of chlorine atoms include primary, secondary, or tertiary amines, organic acid salts and adducts of these amines, guanidine-type accelerators, thiuram-type accelerators, and dithiocarbamate-type accelerators. Examples of the retarders include N-cyclohexane thiophthalimide and zinc dithiocarbamates.

For the vulcanization accelerators, preferred examples of the primary, secondary, or tertiary amines include primary, secondary, or tertiary amines of C5-C20 aliphatic or cyclic fatty acids. Representative examples of these amines include n-hexylamine, octylamine, dibutylamine, tributylamine, and hexamethylenediamine.

Examples of organic acids to form a salt with an amine include carboxylic acids, carbamic acid, 2-mercaptobenzothiazole, and dithiophosphoric acid. Examples of substances to form an adduct with an amine include alcohols and oximes. Specific examples of the organic acid salts and adducts of the amines include n-butylamine acetate, hexamethylenediamine carbamate, and a dicyclohexylamine salt of 2-mercaptobenzothiazole.

Examples of the guanidine-type accelerators include diphenyl guanidine and ditolyl guanidine.

Specific examples of the thiuram-type vulcanization accelerators include tetramethylthiuram disulfide, tetramethylthiuram monosulfide, tetraethylthiuram disulfide, tetrabutylthiuram disulfide, and dipentamethylenethiuram tetrasulfide.

Examples of the dithiocarbamate-type accelerators include a piperidine salt of pentamethylene dithiocarbamate.

The amount of the vulcanization accelerator or retarder used with a known vulcanizing agent utilizing the reactivity of chlorine atoms is preferably 0 to 10 parts by weight, more preferably 0.1 to 5 parts by weight, relative to 100 parts by weight of the rubber component.

For the epichlorohydrin rubber (b1-1) which is a double bond-containing polymer such as an epichlorohydrin/allyl glycidyl ether copolymer or an epichlorohydrin/ethylene oxide/allyl glycidyl ether terpolymer, additives usually used for nitrile rubber vulcanization may be used, such as a known vulcanizing agent, vulcanization accelerator, vulcanization retarder, vulcanization accelerating aid, and crosslinking aid. Examples of the vulcanizing agent include sulfur-type vulcanizing agents such as sulfur, morpholine disulfide, tetramethylthiuram disulfide, tetraethylthiuram disulfide, tetrabutylthiuram disulfide, N,N'-dimethyl-N,N'-diphenylthiuram disulfide, dipentanemethylenethiuram tetrasulfide, dipentamethylenethiuram tetrasulfide, and dipentamethylenethiuram hexasulfide; peroxide-type vulcanizing agents such as tert-butyl hydroperoxide, p-menthane hydroperoxide, dicumyl peroxide, tert-butyl peroxide, 1,3-bis(tert-butylperoxyisopropyl)benzene, 2,5-dimethyl-2,5-di(tert-butylperoxy)hexane, benzoyl peroxide, and tert-butyl peroxybenzoate; resin-type vulcanizing agents such as alkylphenol formaldehyde resins; and quinone dioxime-type vulcanizing agents such as p-quinone dioxime and p-p'-dibenzoylquinone dioxime. These vulcanizing agents may be used alone or in combination of two or more thereof.

Examples of the vulcanization accelerators, vulcanization retarders, vulcanization accelerating aids, and crosslinking aids include various vulcanization accelerators such as aldehyde ammonia-type accelerators, aldehyde amine-type accelerators, thiourea-type accelerators, guanidine-type accelerators, thiazole-type accelerators, sulfenamide-type accelerators, thiuram-type accelerators, dithiocarbamate-type accelerators, and xanthate-type accelerators; vulcanization retarders such as N-nitroso diphenylamine, phthalic anhydride, and N-cyclohexylthiophthalimide; vulcanization accelerating aids such as zinc white, stearic acid, and zinc stearate; and various crosslinking aids such as quinone dioxime-type crosslinking aids, methacrylate-type crosslinking aids, allyl-type crosslinking aids, and maleimide-type crosslinking aids.

In order to achieve good heat resistance of the epichlorohydrin rubber (b1-1) and good adhesiveness between the layer (A) and the layer (B), the vulcanizing agent is preferably at least one vulcanizing agent (b5-1) selected from the group consisting of a thiourea-type vulcanizing agent, a quinoxaline-type vulcanizing agent, a sulfur-type vulcanizing agent, a peroxide-type vulcanizing agent, and a bisphenol-type vulcanizing agent, more preferably at least one vulcanizing agent selected from the group consisting of a thiourea-type vulcanizing agent, a quinoxaline-type vulcanizing agent, and a bisphenol-type vulcanizing agent, particularly preferably a quinoxaline-type vulcanizing agent. These vulcanizing agents may be used alone or in combination of two or more thereof.

The vulcanizable rubber composition preferably contains 0.1 to 10 parts by weight, more preferably 0.5 to 5 parts by weight, of the vulcanizing agent (b5-1) relative to 100 parts by weight of the epichlorohydrin rubber (b1-1). Less than 0.1 parts by weight of the vulcanizing agent may cause an insufficient crosslinking effect. More than 10 parts by weight thereof may cause a molded article obtainable by molding the laminate of the invention to be too rigid, causing a failure in achieving practical rubber physical properties.

In a preferred embodiment, the vulcanizable rubber composition further contains a peroxide-type vulcanizing agent in addition to at least one vulcanizing agent selected from the group consisting of a thiourea-type vulcanizing agent, a quinoxaline-type vulcanizing agent, and a bisphenol-type vulcanizing agent. The peroxide-type vulcanizing agent is preferably dicumyl peroxide. The amount of the peroxide-type vulcanizing agent is preferably 1 part by mass or more, more preferably 2 parts by mass or more, relative to 100 parts by mass of the epichlorohydrin rubber (b1-1). The amount thereof is preferably 5 parts by mass or less. For example, the vulcanizable rubber composition containing small amounts of the compound (b2-1) and the epoxy resin (b7) may fail to achieve good adhesiveness. Still, the presence of a peroxide-type vulcanizing agent can provide good adhesiveness to an adjacent layer even though the amounts of the compound (b2-1) and the epoxy resin (b7) are small.

The vulcanizable rubber composition may further contain an acid acceptor. Examples of the acid acceptor include: oxides (excluding magnesium oxide), hydroxides, carbonates, carboxylates, silicates, borates, and phosphites of metals in the group (II) of the periodic table; oxides, basic carbonates, basic carboxylates, basic phosphites, and basic sulfites of metals in the group (IV) of the periodic table; synthesized hydrotalcites represented by the following formula (2):

$$Mg_xZn_yAl_z(OH)_{2(x+y)+3z-2}CO_3 \cdot wH_2O \quad (2)$$

(wherein x and y are each a real number of 0 to 10, with x+y=1 to 10; z is a real number of 1 to 5; and w is a real number of 0 to 10); and Li—Al inclusion compounds represented by the following formula (C):

$$[Al_2Li(OH)_6]_n \cdot X \cdot mH_2O \quad \text{(C)}$$

(wherein X is an inorganic or organic anion; n is the valence of the anion X; and m is a figure of 3 or smaller).

Specific examples of the acid acceptor include magnesium hydroxide, barium hydroxide, magnesium carbonate, barium carbonate, quicklime, slaked lime, calcium carbonate, calcium silicate, calcium stearate, zinc stearate, calcium phthalate, calcium phosphite, tin oxide, and basic tin phosphite.

An example of the synthesized hydrotalcites represented by the formula (2) is $Mg_3ZnAl_2(OH)_{12}CO_3 \cdot wH_2O$. A compound represented by the following formula (D):

$$Mg_xAl_y(OH)_{2x+3y-2}CO_3 \cdot wH_2O \quad \text{(D)}$$

(wherein x is 1 to 10; y is 1 to 10; and w is a positive integer), which is included in the formula (2), may also be used. Specific examples thereof include $Mg_{4.5}Al_2(OH)_{13}CO_3 \cdot 3.5H_2O$, $Mg_{4.5}Al_2(OH)_{13}CO_3$, $Mg_4Al_2(OH)_{12}CO_3 \cdot 3.5H_2O$, $Mg_6Al_2(OH)_{16}CO_3 \cdot 4H_2O$, and $Mg_3Al_2(OH))_{10}CO_3 \cdot 1.7H_2O$.

An example of the Li—Al inclusion compound represented by the formula (C) is $[Al_2Li(OH)_6]_2CO_3 \cdot H_2O$.

Examples of the anion species of the Li—Al inclusion compound include carbonic acid, sulfuric acid, perchloric acid, an oxyacid of phosphoric acid, acetic acid, propionic acid, adipic acid, benzoic acid, phthalic acid, terephthalic acid, maleic acid, fumaric acid, succinic acid, p-oxybenzoic acid, salicylic acid, and picric acid. One of these acid acceptors may be used alone or two or more thereof may be used in the form of a mixture.

In order to achieve good heat resistance of an epihalohydrin-type rubber, acid acceptors preferably used among the acid acceptors are metal oxides, metal hydroxides, and inorganic macroporous crystals. These acid acceptors are used in an amount within the range that does not impair the adhesiveness to an adjacent layer.

In order to prevent inhibition of vulcanization performance and impairment of the rubber physical properties, the vulcanizable rubber composition is preferably free from an amine compound.

The vulcanizable rubber composition preferably further contains a water-supporting substance (b9).

The water-supporting substance (b9) is preferably at least one selected from a substance absorbing water and a hydrous substance.

Examples of the substance absorbing water serving as the water-supporting substance (b9) include substances absorbing water obtainable by allowing a polyether compound or a metal compound to absorb water. Absorption of water by these compounds may be achieved by, but not limited to, contact with (e.g., immersion into) water.

Examples of the polyether compound include polyethylene oxide and polyethylene glycol.

Examples of the metal compound include oxides, hydroxides, carbonates, hydrochlorides, sulfides, sulfates, and silicates of metals, and synthesized hydrotalcites.

Examples of the metal hydroxides include aluminum hydroxide, magnesium hydroxide, calcium hydroxide, barium hydroxide, zinc hydroxide, iron hydroxide, copper hydroxide, and manganese hydroxide.

Examples of the metal oxides include aluminum oxide, calcium oxide, magnesium oxide, titanium oxide, and copper oxide.

Examples of the metal carbonates include aluminum carbonate, calcium carbonate, magnesium carbonate, barium carbonate, and copper carbonate.

Examples of the metal hydrochlorides include aluminum chloride, calcium chloride, magnesium chloride, and copper chloride.

Examples of the metal sulfides include zinc sulfide, calcium sulfide, magnesium sulfide, copper sulfide, and zinc sulfide.

Examples of the metal sulfates include calcium sulfate, barium sulfate, aluminum sulfate, sodium sulfate, and copper sulfate.

Examples of the metal silicates include aluminum silicate, calcium silicate, magnesium silicate, sodium silicate, and copper silicate.

In order to improve the adhesiveness, the substance absorbing water serving as the water-supporting substance (b9) is preferably a compound having a water retention of 5% by mass or higher, more preferably a compound having a water retention of 10% by mass or higher. The water retention is the percentage of water retained by the substance absorbing water, and is calculated by the following formula.

Water retention (% by mass)=(amount of water retained by substance absorbing water (mass))/amount of substance absorbing water (mass))×100

Examples of the hydrous substance serving as the water-supporting substance (b9) include hydrated metal salts.

Examples of the hydrated metal salts include hydrated salts of inorganic acids such as silicic acid, boric acid, phosphoric acid, hydrochloric acid, hydrogen sulfide, sulfuric acid, nitric acid, and carbonic acid, and hydrated salts of organic acids such as carboxylic acids, including benzoic acid, phthalic acid, maleic acid, succinic acid, salicylic acid, and citric acid, of metals such as calcium, aluminum, zinc, manganese, lanthanum, titanium, zirconium, iron, cobalt, nickel, magnesium, and copper. Preferred is a hydrate of a metal salt selected from calcium acetate, aluminum sulfate, sodium sulfate, calcium sulfate, magnesium sulfate, zinc sulfate, manganese sulfate, copper sulfate, lanthanum sulfate, titanium sulfate, zirconium sulfate, iron sulfate, cobalt sulfate, and nickel sulfate. Preferred are hydrates of a sulfate and/or an acetate of a metal selected from calcium, magnesium, sodium, and copper. More preferred is calcium sulfate dihydrate, sodium sulfate decahydrate, or copper (II) sulfate pentahydrate, particularly preferred is calcium sulfate dihydrate or sodium sulfate decahydrate.

The amount of the water-supporting substance (b9) is 0.1 to 80 parts by mass, preferably 0.5 to 70 parts by mass, still more preferably 1 to 50 parts by mass, particularly preferably 1 to 20 parts by mass, relative to 100 parts by mass of the epichlorohydrin rubber (b1-1). The water-supporting substance (b9) in an amount within this range is preferred because the substance can provide a sufficient adhesion effect and avoid impairment of mechanical physical properties of the vulcanizate.

The vulcanizable rubber composition may further contain a copper salt.

The copper salt is preferably an organic copper salt. Examples of the organic copper salt include copper salts of saturated carboxylic acids such as formic acid, acetic acid, butyric acid, and stearic acid; copper salts of unsaturated carboxylic acids such as oleic acid and linoleic acid; copper salts of aromatic carboxylic acids such as salicylic acid, benzoic acid, and phthalic acid; copper salts of dicarboxylic acids such as oxalic acid, succinic acid, adipic acid, maleic acid, and fumaric acid; copper salts of hydroxy acids such as lactic acid and citric acid; copper salts of carbamic acid; and copper salts of thiocarbamic acid or sulfonic acid such as copper dimethyldithiocarbamate, copper diethyldithiocarbamate, copper dibutyldithiocarbamate, copper N-ethyl-N-phenyldithiocarbamate, copper N-pentamethylenedithiocarbamate, and copper dibenzyldithiocarbamate. The organic copper salt is preferably a copper salt of a saturated carboxylic acid, a copper salt of an unsaturated carboxylic acid, a copper salt of an aromatic carboxylic acid, or a copper salt of thiocarbamic acid, more preferably copper stearate, copper dimethyldithiocarbamate, copper diethyldithiocarbamate, or copper dibutyldithiocarbamate.

In order to improve the adhesiveness, the amount of the copper salt is 0.01 to 5 parts by mass, preferably 0.05 to 3 parts by mass, more preferably 0.1 to 2 parts by mass, relative to 100 parts by mass of the epichlorohydrin rubber (b1-1). The copper salt in an amount within this range is preferred because it can provide a sufficient adhesion effect and avoid impairment of mechanical physical properties of the vulcanizate.

In order to give the layer (A) a characteristic different from that achieved by the epichlorohydrin rubber (b1-1), the vulcanizable rubber composition may further contain a different resin other than the epoxy resin. Examples of the resin include polymethyl methacrylate (PMMA) resin, polystyrene (PS) resin, polyurethane (PUR) resin, polyvinyl chloride (PVC) resin, ethylene-vinyl acetate (EVA) resin, styrene-acrylonitrile (AS) resin, polyethylene (PE) resin, chlorinated polystyrene, and chlorosulfonated polystyrene ethylene. In this case, the amount of the resin is preferably 1 to 50 parts by mass relative to 100 parts by mass of the epichlorohydrin rubber (b1-1).

In the invention, any common additives usually added to vulcanizable rubber compositions may be added in accordance with the purpose or the necessity. Examples thereof include a variety of additives such as a filler, a processing aid, a plasticizer, a softening agent, an antioxidant, a colorant, a stabilizer, an adhesive aid, a release agent, a conductivity-imparting agent, a thermal-conductivity-imparting agent, a surface non-adhesive agent, a tackifier, a flexibility-imparting agent, a heat resistance improver, a flame retarder, an ultraviolet absorber, an oil resistance improver, a blowing agent, a scorch inhibitor, and a lubricant. One or two or more of common vulcanizing agents and vulcanization accelerators other than the above may also be added. It should be noted that these additives are used in amounts to the extent that does not impair the adhesiveness to the layer (B).

Examples of the filler, the processing aid, and the plasticizer are the same as those mentioned above.

The vulcanizable rubber composition may be prepared by kneading the epichlorohydrin rubber (b1-1), the compound (b2-1), the acid acceptor (b3-1), and the epoxy resin (b7-1), and optionally the silica (b4-1), the zinc oxide (b8), the vulcanizing agent (b5-1), and other additives.

The kneading may be performed at 150° C. or lower using an open roll mill, a Banbury mixer, a pressure kneader, or the like.

The laminate of the invention may be produced by stacking the rubber layer (A) and the fluororesin layer (B). For the laminate of the invention, the rubber layer (A) may be stacked on each side of the fluororesin layer (B), or the fluororesin layer (B) may be stacked on each side of the rubber layer (A).

Stacking of the rubber layer (A) and the fluororesin layer (B) may be achieved by any of a method in which the rubber layer (A) and the fluororesin layer (B) are prepared separately and then stacked by, for example, compression; a method in which the rubber layer (A) and the fluororesin layer (B) are prepared and stacked simultaneously; and a method in which the fluororesin layer (B) is applied to the rubber layer (A).

In the method of preparing the rubber layer (A) and the fluororesin layer (B) separately and then stacking them by compression, the fluoropolymer and the vulcanizable rubber composition may be molded by the same molding method or by different molding methods.

For the molding of the rubber layer (A), the molded article having any shape such as a sheet or a tube may be prepared by heat compression molding, transfer molding, extrusion molding, injection molding, calender molding, or coating of the vulcanizable rubber composition.

The fluororesin layer (B) may be molded by, for example, heat compression molding, melt extrusion molding, injection molding, or coating (including powder coating). The molding may be performed using any molding device usually used for fluoropolymers, such as an injection molding device, a blow molding device, an extrusion molding device, or any coating device. They can provide a laminate having any shape such as a sheet or a tube. In order to achieve excellent productivity, melt extrusion molding is preferred.

As will be described later, in the case of stacking a polymer layer (C) on the fluororesin layer (B), a molding method such as multilayer extrusion molding, multilayer blow molding, or multilayer injection molding may be applied. They can provide a multilayer molded article such as a multilayer tube, a multilayer hose, or a multilayer tank.

The method of simultaneously molding and stacking the rubber layer (A) and the fluororesin layer (B) may be a method in which a vulcanizable rubber composition to form the rubber layer (A) and the copolymer to form the fluororesin layer (B) are molded and stacked simultaneously by a technique such as multilayer compression molding, multilayer transfer molding, multilayer extrusion molding, multilayer injection molding, or doubling. This method enables simultaneous stacking of the rubber layer (A) and the fluororesin layer (B). Thus, the method needs no step of closely bonding the rubber layer (A) and the fluororesin layer (B) and is suitable to achieve firm bonding in the following vulcanization.

This method can provide an unvulcanized laminate in which the unvulcanized rubber layer (A) and the fluororesin layer (B) are stacked.

The laminate of the invention is preferably one obtainable by performing vulcanization treatment on an unvulcanized laminate obtainable by the above method. In the laminate obtainable by performing vulcanization treatment to the unvulcanized laminate, the rubber layer (A) and the fluororesin layer (B) are vulcanization-bonded to each other with firm adhesiveness.

The vulcanization treatment may be performed by any vulcanization method under any conditions for conventionally known vulcanizable rubber compositions. Examples of the method include a method of vulcanizing an unvulcanized laminate for a long time, and a method of heating an unvulcanized laminate in a relatively short time as a pre-treatment (vulcanization also occurs at this stage), and then vulcanizing the laminate for a long time. Preferred among these is the method of heating an unvulcanized laminate in a relatively short time as a pre-treatment, and then vulcanizing the laminate for a long time. This is because the method can easily provide close bonding between the rubber layer (A) and the fluororesin layer (B) in the pre-treatment, and the rubber layer (A) is vulcanized so that the shape thereof is stabilized in the pre-treatment. Thus, a method of holding the laminate in the following vulcanization can be selected from a variety of methods.

The conditions for the vulcanization treatment may be any usual conditions. The vulcanization treatment is preferably performed at 130° C. to 260° C. for 10 minutes to 80 hours using steam, a press, an oven, an air bath, infrared radiation, or microwaves, or by lead-covered vulcanization. The vulcanization treatment is more preferably performed at 160° C. to 230° C. for 20 minutes to 80 hours.

The heating conditions for the pre-treatment may also be any conditions. The pre-treatment is preferably performed at 100° C. to 170° C. for 30 seconds to 1 hour using steam, a press, an oven, an air bath, infrared radiation, microwaves, or lead-covered vulcanization.

In the resulting laminate, the rubber layer (A) and the fluororesin layer (B) are vulcanization-bonded to each other with firm interlayer adhesiveness.

The laminate of the invention may have a bilayer structure of the rubber layer (A) and the fluororesin layer (B), or may have a trilayer structure of (A)-(B)-(A) or (B)-(A)-(B). The laminate may have a multilayer structure of three or more layers including a polymer layer (C) bonded therein in addition to the rubber layer (A) and the fluororesin layer (B).

The polymer layer (C) may be a rubber layer (C1) other than the rubber layer (A), a resin layer (C2) other than the fluororesin layer (B), or a fiber-reinforced layer, for example. Another rubber layer (A) and/or fluororesin layer (B) may be further stacked with the polymer layer (C) in between.

The material of the rubber layer (C1) may be a rubber other than the rubber used for the rubber layer (A) directly bonded to the fluororesin layer (B), and may be either a fluoroelastomer or a non-fluoroelastomer. Specific examples thereof include those mentioned as examples of the unvulcanized rubber (al).

The unvulcanized rubber composition to form the rubber layer (C1) may also contain a vulcanizing agent (a6) and any other compounding agents.

Examples of the material of the resin layer (C2) include resins having excellent mechanical strength such as fluororesin (other than the fluororesin layer (B)), polyamide resin, polyolefin resin, vinyl chloride resin, polyurethane resin, polyester resin, polyaramid resin, polyimide resin, polyamide-imide resin, polyphenylene oxide resin, polyacetal resin, polycarbonate resin, acrylic resin, styrene resin, acrylonitrile/butadiene/styrene (ABS) resin, cellulose resin, polyether ether ketone (PEEK) resin, polysulfone resin, polyethersulfone (PES) resin, and polyetherimide resin, and resins having low permeability against fuel and gas (hereinafter, also referred to as low permeability resins) such as resin formed from ethylene/vinyl alcohol copolymers, polyphenylene sulfide resin, polybutylene naphthalate resin, polybutylene terephthalate resin, and polyphthalamide (PPA). In order to achieve good moldability and adhesiveness, polyamide resin is preferred. In the case of subjecting the laminate to the vulcanization treatment, the melting point of the resin is preferably higher than the temperature of the heating treatment.

Next, the layer structure of the laminate of the invention is described below.

(1) Bilayer Structure of Rubber Layer (A)-Fluororesin Layer (B)

This is a basic structure. Conventional structures of this type suffer insufficient bonding between the fluororesin layer and the rubber layer, and thus stacking of the fluororesin layer (B) and the rubber layer (A) requires surface treatment on the resin side, application of additional adhesive between the layers, or fixing of the layers by wrapping a tape-shaped film. However, such treatment causes complication of the process. In the invention, vulcanization leads to vulcanization bonding, so that chemically firm bonding between the layers can be achieved without such a complicated process.

(2) Trilayer Structure of Rubber Layer-Fluororesin Layer (B)-Rubber Layer

Examples of this structure include (A)-(B)-(A) and (A)-(B)-(C1). In the case where the sealability is required, such as the case of joint portions of fuel pipes, the rubber layer is preferably provided on each side of the fluororesin layer so as to secure the sealability. The inner and outer rubber layers may be the same as or different from each other.

In order to improve the chemical resistance and the low fuel permeability, a fuel pipe may have an (A)-(B)-(C1) trilayer structure in which the rubber layer (A) is a non-fluoroelastomer layer and the rubber layer (C1) is a fluoroelastomer layer with the fluoroelastomer layer (C1) serving as an inner layer of the pipe.

(3) Trilayer Structure of Resin Layer-Rubber Layer (A)-Resin layer

Examples of this structure include (B)-(A)-(B) and (B)-(A)-(C2).

The inner and outer rubber layers may be the same as or different from each other.

The presence of a resin layer on each side stabilizes the shape. Also, this structure is suitable for the cases where the chemical resistance is important. When the respective surfaces require different mechanical properties, the (B)-(A)-(C2) structure may be applied.

(4) Trilayer Structure of Resin Layer (C2)-Fluororesin Layer (B)-Rubber Layer (A)

(5) Trilayer Structure of Fluororesin Layer (B)-Rubber Layer (A)-Rubber Layer (C1)

(6) Structures Including Four or More Layers

In accordance with the purpose, any of the rubber layers (A) and (C1) and the resin layers (B) and (C2) may be stacked on any of the trilayer structures (2) to (5). Examples of these structures include (A)-(B)-(A)-(C1) and (C1)-(A)-(B)-(A)-(C1). Another layer such as metal foil may be disposed, an adhesive layer may be disposed between the layers excluding between the rubber layer (A) and the fluororesin layer (B), or a surface treatment may be performed on the fluororesin layer.

Further, the polymer layer (C) may be stacked to provide a lined article.

The parameters such as thicknesses and shapes of the respective layers may be appropriately selected in accordance with the purpose and form of use, for example.

The laminate of the invention has excellently low fuel permeability, as well as excellent heat resistance, oil resistance, fuel oil resistance, antifreeze resistance, and steam resistance. Further, the laminate of the invention is sufficiently tolerant of use under severe conditions, and thus can be used in a variety of applications.

For example, the laminate has properties suitable for seals such as gaskets, non-contact or contact packings (e.g., self-seal packings, piston rings, split ring packings, mechanical seals, oil seals), bellows, diaphragms, hoses, tubes, and electric wires, which are required to have heat resistance, oil resistance, fuel oil resistance, antifreeze resistance, and steam resistance, of engine bodies, main drive systems, valve train systems, lubrication and cooling systems, fuel systems, and intake and exhaust systems of automobile engines, transmission systems of driveline systems, steering systems and braking systems of chassis, and basic electrical parts of electrical equipment, electrical parts of control systems, and electrical equipment accessories.

Specifically, the laminate can be used in the following applications:

gaskets such as cylinder head gaskets, cylinder head cover gaskets, sump packings, and general gaskets, seals such as O-rings, packings, and timing belt cover gaskets, and hoses such as control hoses, of engine bodies, anti-vibration rubber of engine mounts, and sealants for high-pressure valves in hydrogen storage systems;

shaft seals such as crankshaft seals and camshaft seals of main drive systems;

valve stem seals such as engine valves of valve train systems;

engine oil cooler hoses of engine oil coolers, oil return hoses, seal gaskets, water hoses used around radiators, and vacuum pump oil hoses of vacuum pumps, of lubrication and cooling systems;

oil seals, diaphragms, and valves of fuel pumps, fuel hoses such as filler (neck) hoses, fuel supply hoses, fuel return hoses, and vapor (evaporator) hoses, in-tank hoses, filler seals, tank packings, and in-tank fuel pump mounts of fuel tanks, tube bodies and connector O-rings of fuel pipe tubes, injector cushion rings, injector seal rings, injector O-rings, pressure regulator diaphragms, and check valves of fuel injection systems, needle valve petals, accelerator pump pistons, flange gaskets, and control hoses of carburetors, and valve seats and diaphragms of combined air controlling (CAC) systems in fuel systems;

intake manifold packings and exhaust manifold packings of manifolds, diaphragms, control hoses, and emission control hoses of exhaust gas recirculation (EGR) systems, diaphragms of BPT, after burn preventive valve seats of AB valves, throttle body packings of throttles, turbo oil hoses (supply), turbo oil hoses (return), turbo air hoses, intercooler hoses, and turbine shaft seals of turbochargers, of intake and exhaust systems;

transmission-related bearing seals, oil seals, 0-rings, packings, and torque converter hoses, and gear oil hoses, ATF hoses, O-rings, and packings of ATs, of transmission systems;

power steering oil hoses of steering systems;

oil seals, O-rings, packings, brake fluid hoses, air valves, vacuum valves, and diaphragms of vacuum servos, piston cups (rubber cups) of master cylinders, caliper seals, and boots, of braking systems;

insulators and sheaths of electric wires (harnesses), and tubes of harness-holding parts of basic electrical parts;

cover materials for sensor lines of control system electrical parts; and

O-rings, packings, and air conditioner hoses of electrical equipment accessories, and wiper blades of exterior parts.

In addition to the field of automobiles, for example, the laminate of the invention can be suitably used in the following applications: oil-resistant, chemical-resistant, heat-resistant, steam-resistant, or weather-resistant packings, O-rings, hoses, other sealants, diaphragms, and valves in a means of transportation, such as shipment and aircraft; similar packings, O-rings, sealants, diaphragms, valves, hoses, rolls, tubes, chemical-resistant coatings, and linings in chemical plants; similar packings, O-rings, hoses, sealants, belts, diaphragms, valves, rolls, and tubes in food plant equipment and food-related devices (including household utensils); similar packings, O-rings, hoses, sealants, diaphragms, valves, and tubes in nuclear power plant equipment; similar packings, O-rings, hoses, sealants, diaphragms, valves, rolls, tubes, linings, mandrels, electric wires, expansion joints, belts, rubber plates, and weather strips in general industrial parts; and roll blades of plain paper copiers. For example, back-up rubber materials of PTFE diaphragms are poor in slidability, and thus are worn down or broken during use. In contrast, the laminate of the invention can solve such problems, and thus is suitably used.

In the case of food-related rubber sealants, conventional rubber sealants cause problems such as scent absorption and contamination of foods by rubber chips. In contrast, the laminate of the invention can solve such problems, and thus is suitably used. In the case of medical and chemical applications, rubber materials used as sealants for pipes using rubber sealant solvents disadvantageously swell by such solvents. In contrast, the laminate of the invention can solve such problems because the rubber is covered with resin. In general industrial fields, the laminate can be suitably used for rubber rolls, O-rings, packings, and sealants in order to improve the strength, slidability, chemical resistance, and permeability of rubber materials. In particular, the laminate can be suitably used for packing of lithium ion batteries because the laminate maintains the chemical resistance and the sealability simultaneously. Further, the laminate can be suitably used in applications requiring slidability with low friction.

In the case of the medical applications, the laminate of the invention can be suitably used in the following applications: drug closures, bottle cap seals, can seals, medicinal tapes, medicinal pads, syringe packings, bases for percutaneous absorption drugs, teats of baby bottles, medical bags, catheters, infusion sets, coinjection tubes, cap liners, caps of vacuum blood collection tubes, cyringe gaskets, infusion tubes, gaskets and caps of medical equipment, syringe tips, grommets, caps of blood collection tubes, cap seals, packings, O-rings, sheath introducers, dilator; guiding sheaths, blood circuits, cardiopulmonary bypass circuits, tubes for rotablators, catheter needles, infusion sets, infusion tubes, needleless infusion systems, infusion bags, blood bags, blood component separation bags, tubes for blood component separation bags, artificial blood vessels, arterial cannulae, stents, protective tubes for endoscope treatment devices, scope tubes for endoscopes, top overtubes for endoscopes, guiding tubes for pharyngeal transit, tubes for coronary artery bypass graft surgery, ileus tubes, tubes for percutaneous transhepatic biliary drainage, outer tubes for electrosurgical knives, outer tubes for ultrasonic scalpels, outer tubes for dissecting forceps, and bags for cell culture.

Examples of the molded articles for offshore uses to which the laminate of the invention may be applied include tubes and hoses for offshore oil fields (including injection tubes and crude oil transport tubes).

The laminate of the invention is particularly preferably used for fuel pipes among these owing to its heat resistance and low fuel permeability.

Fuel pipes formed from the laminate of the invention can be produced by any usual method. The fuel pipes include corrugated tubes.

The invention also relates to a copolymer for use in production of the above laminate, the copolymer containing 96.0 to 97.4 mol % of a chlorotrifluoroethylene unit and a tetrafluoroethylene unit relative to all the monomer units constituting the copolymer and 2.6 to 4.0 mol % of a perfluoroalkyl vinyl ether unit relative to all the monomer units constituting the copolymer.

Preferred embodiments of the copolymer are as described above.

EXAMPLES

The invention is described hereinbelow with reference to examples. Still, the invention is not intended to be limited by these examples.

The parameters in the examples were determined by the following methods.

Composition of Fluororesin (Copolymer)

The composition of the fluororesin was determined by $^{19}$F-NMR analysis.

Fuel Permeability

Pellets of a copolymer having the composition shown in Table 2 were put into a mold having a diameter of 120 mm. The workpiece was mounted on a press heated up to 300° C., and melt-pressed at a pressure of about 2.9 MPa. Thereby, a sheet having a thickness of 0.15 mm was obtained. This sheet was put into a SUS316 cup for fuel permeability measurement having an inner diameter of 40 mm and a height of 20 mm and containing 18 mL of CE10 (fuel prepared by mixing a mixture of isooctane and toluene at a volume ratio of 50:50 and 10% by volume of ethanol), and the mass change at 60° C. was measured for 1000 hours. The fuel permeability (g·mm/m$^2$/day) was calculated from the mass change per hour, the surface area of the sheet at the liquid-contact portion, and the thickness of the sheet.

Solvent Cracking Resistance

An extruded film having a thickness of 120 μm prepared using an extruder was cut into a JIS K6301 #1 dumbbell. This test piece was mounted on a jig. The whole test piece together with the jig was immersed in CE10. The test piece was stretched at a rate of about 20 ram/min in CE10 immediately after the immersion. The stretched test piece was left for 15 minutes and then taken out. The degree of stretching at which cracking (excluding cracking at edges) occurred was visually observed.

Melt Flow Rate (MFR)

The mass (g) of the polymer that flowed out of a nozzle having a diameter of 2 mm and a length of 8 mm per unit time (10 minutes) was determined at a temperature of 297° C. and a load of 5.0 kg using a melt indexer (Toyo Seiki Seisaku-sho, Ltd.).

Production Examples 1 to 7

Pellets of a copolymer having the composition shown in Table 2 were formed into a fluororesin sheet using a 30-mm-diameter single layer extruder. For the extruder settings, the cylinder temperature was 275° C. to 285° C., the head temperature was 285° C., the die temperature was 290° C. to 295° C., the screw rotational speed was 33 rpm, the sheet take-up speed was 3 m/min, and the lip-to-lip distance was 1150 μm.

Table 2 shows the MFR of each copolymer and the thickness of the fluororesin sheet obtained in each production example. In the table, PPVE means perfluoro(propyl vinyl ether) and HFP means hexafluoropropylene.

TABLE 2

| | Composition of copolymer (mol %) | MFR (g/10 min) | Sheet thickness (μm) |
|---|---|---|---|
| Production Example 1 | CTFE/TFE/PPVE 21.2/76.1/2.7 | 13.6 | 120 |
| Production Example 2 | CTFE/TFE/PPVE 21.3/76.0/2.7 | 22.4 | 120 |
| Production Example 3 | CTFE/TFE/PPVE 21.0/75.8/3.2 | 13.3 | 120 |
| Production Example 4 | CTFE/TFE/PPVE 21.1/75.7/3.2 | 21.9 | 120 |
| Production Example 5 | CTFE/TFE/PPVE 21.1/76.5/2.4 | 7.0 | 120 |
| Production Example 6 | CTFE/TFE/PPVE/HFP 16.1/79.7/2.6/1.6 | 26.3 | 120 |
| Production Example 7 | CTFE/TFE/PPVE 20.3/75.0/4.7 | 18.3 | 120 |

Production Example 8

The materials shown in Table 3 were kneaded using an 8-inch open roll mill controlled to 40° C., whereby a sheet-shaped vulcanizable rubber composition having a thickness of about 3 mm was obtained. In Table 3, the unit of each value is parts by mass.

TABLE 3

| Material name | Amount |
|---|---|
| Epichlorohydrin rubber | 100.0 |
| Seast SO | 50.0 |
| ADK Cizer RS107 | 10.0 |
| Splender R300 | 3.0 |
| Nickel dibutyldithiocarbamate | 1.0 |
| Copper dimethyldithiocarbamate | 0.1 |
| DHT-4A | 3.0 |
| Magnesium oxide | 3.0 |
| N-cyclohexylthiophthalimide | 1.0 |
| Daisonet XL-21S | 1.7 |
| JER828 | 1.5 |
| DBU-phenoxide | 1.0 |
| Total | 175.3 |

Examples 1 to 4 and Comparative Examples 1 and 2

The vulcanizable rubber composition sheet having a thickness of about 3 mm shown in Table 3 and the fluororesin sheet having the thickness shown in Table 2 were stacked, and a resin film (a release film having a thickness of 10 μm) having a width of about 10 to 15 mm was inserted between the sheets at an end of the stack. The resulting stack was inserted between dies with a metal spacer placed therebetween so as to allow the resulting sheet to have a thickness of 2 mm. The stack was pressed at 160° C. for 45 minutes, whereby a sheet-shaped laminate was obtained. The resulting laminate was cut into three strips having a width of 10 mm and a length of 40 mm. The release film was peeled off to provide a margin for holding. Whereby, a test piece was prepared. This test piece was subjected to a peeling test at 25° C. and a tensile rate of 50 mm/min using an autograph (AGS-J 5 kN, Shimadzu Corp.) in conformity with JIS K6256 (determination of adhesion strength for crosslinked rubber). Whereby, the bond strength was determined. Also, the mode of peeling was observed and evaluated by the following criteria. The results obtained are shown in Table 4.

Criteria of Evaluating Adhesiveness

Good: The layer of the vulcanizable rubber composition sheet or of the fluororesin sheet suffered material failure at the interface of the laminate, which means the layers were not separated at the interface. In the table, the bond strength with the adhesiveness evaluated as good means the strength at which the material with a lower strength between the resin layer and the rubber layer was broken.

Poor: The layers of the laminate were separated at the interface and the peel strength at the interface was 15 N/cm or lower.

TABLE 4

| | Rubber layer | Fluororesin layer | Fuel permeability of fluororesin layer (g · mm/m$^2$/day) | Solvent cracking resistance of fluororesin layer | Evaluation of adhesiveness | Bond strength (N/cm) |
|---|---|---|---|---|---|---|
| Example 1 | Production Example 8 | Production Example 1 | 0.4 | 9% | Good | 22 |
| Example 2 | Production Example 8 | Production Example 2 | 0.4 | 9% | Good | 23 |
| Example 3 | Production Example 8 | Production Example 3 | 0.4 | 12% | Good | 24 |
| Example 4 | Production Example 8 | Production Example 4 | 0.4 | 12% | Good | 24 |
| Comparative Example 1 | Production Example 8 | Production Example 5 | 0.4 | 3% | Poor | 10 |
| Comparative Example 2 | Production Example 8 | Production Example 6 | 0.4 | 11% | Poor | 13 |

Production Example 9

The materials shown in Table 5 were kneaded using an 8-inch open roll mill controlled to 40° C., whereby a sheet-shaped vulcanizable rubber composition having a thickness of about 3 mm was obtained. In Table 5, the unit of each value is parts by mass.

TABLE 5

| Material name | Amount |
|---|---|
| Nipol DN101 | 100.0 |
| Stearic acid | 1.0 |
| Magnesium oxide | 10.0 |
| DBU-phenoxide | 1.0 |
| Seast S | 50.0 |
| Carplex 1120 | 20.0 |
| Thiokol TP95 | 25.0 |
| Sulfur fine powder | 1.5 |
| Total | 208.5 |

Examples 5 to 8 and Comparative Examples 3 and 4

The vulcanizable rubber composition sheet having a thickness of about 3 mm shown in Table 5 and the fluororesin sheet having the thickness shown in Table 2 were stacked, and a resin film (a release film having a thickness of 10 μm) having a width of about 10 to 15 mm was inserted between the sheets at an end of the stack. The resulting stack was inserted between dies with a metal spacer placed therebetween so as to allow the resulting sheet to have a thickness of 2 mm. The stack was pressed at 160° C. for 45 minutes, whereby a sheet-shaped laminate was obtained. The resulting laminate was cut into three strips having a width of 10 mm and a length of 40 mm. The release film was peeled off to provide a margin for holding. Whereby, a test piece was prepared. This test piece was subjected to a peeling test at 25° C. and a tensile rate of 50 rum/min using an autograph (AGS-J 5 kN, Shimadzu Corp.) in conformity with JIS K6256 (determination of adhesion strength for crosslinked rubber). Whereby, the bond strength was determined. Also, the mode of peeling was observed and evaluated by the following criteria. The results obtained are shown in Table 6.

TABLE 6

| | Rubber layer | Fluororesin layer | Fuel permeability of fluororesin layer (g · mm/m$^2$/day) | Solvent cracking resistance of fluororesin layer | Evaluation of adhesiveness | Bond strength (N/cm) |
|---|---|---|---|---|---|---|
| Example 5 | Production Example 9 | Production Example 1 | 0.4 | 9% | Good | 24 |
| Example 6 | Production Example 9 | Production Example 2 | 0.4 | 9% | Good | 23 |
| Example 7 | Production Example 9 | Production Example 3 | 0.4 | 12% | Good | 21 |
| Example 8 | Production Example 9 | Production Example 4 | 0.4 | 12% | Good | 22 |
| Comparative Example 3 | Production Example 9 | Production Example 6 | 0.4 | 11% | Poor | 14 |
| Comparative Example 4 | Production Example 9 | Production Example 7 | 0.7 | 20% | Poor | 9 |

The invention claimed is:

1. A laminate comprising a rubber layer (A) and a fluororesin layer (B), the fluororesin layer (B) comprising a copolymer containing a chlorotrifluoroethylene unit, a tetrafluoroethylene unit, and a perfluoroalkyl vinyl ether unit, the copolymer containing 96.0 to 97.4 mol % of the chlorotrifluoroethylene unit and the tetrafluoroethylene unit relative to all the monomer units constituting the copolymer and 2.6 to 4.0 mol % of the perfluoroalkyl vinyl ether unit relative to all the monomer units constituting the copolymer, wherein a ratio of the chlorotrifluoroethylene unit to and the tetrafluoroethylene unit is 15-25 to 85-75, and wherein the perfluoroalkyl vinyl ether is represented by the following formula:

CF2=CF—O—Rf wherein Rf is a C1-C5 perfluoroalkyl group.

2. The laminate according to claim 1, wherein the rubber layer (A) contains a non-fluoroelastomer.

3. The laminate according to claim 1, wherein the rubber layer (A) contains at least one non-fluoroelastomer selected from the group consisting of acrylonitrile-butadiene rubber, a hydride of acrylonitrile-butadiene rubber, epichlorohydrin rubber, acrylic rubber, and a rubber blend of two or more thereof.

* * * * *